United States Patent
Turgis et al.

(10) Patent No.: US 10,407,580 B2
(45) Date of Patent: *Sep. 10, 2019

(54) SINGLE PHASE WATER BASED ENERGY CURABLE COMPOSITIONS AND METHOD OF PREPARING COATINGS AND PRINTING INKS

(71) Applicant: SUN CHEMICAL CORPORATION, Parsippany, NJ (US)

(72) Inventors: Jean Do Turgis, Vetrou (FR); Richard M. Jones, Oakridge, NJ (US); Kai-Uwe Gaudl, Alzenau (DE); Mikhail Laksin, Boonton, NJ (US); Subhankar Chatterjee, Hampton, NJ (US); Neil Young, Oakland, NJ (US); Volker Linzer, Wiesbaden/Naurod (DE); John Rooney, Basking Ridge, NJ (US)

(73) Assignee: Sun Chemical Corporation, Parsippany, NJ (US)

( * ) Notice: Subject to any disclaimer, the term of this patent is extended or adjusted under 35 U.S.C. 154(b) by 72 days.

This patent is subject to a terminal disclaimer.

(21) Appl. No.: 15/204,295

(22) Filed: Jul. 7, 2016

(65) Prior Publication Data

US 2016/0362568 A1   Dec. 15, 2016

Related U.S. Application Data

(63) Continuation of application No. 11/919,506, filed as application No. PCT/US03/14293 on May 6, 2003, now Pat. No. 9,410,049.

(60) Provisional application No. 60/380,081, filed on May 6, 2002.

(51) Int. Cl.
| | | |
|---|---|---|
| *C09D 11/101* | (2014.01) | |
| *C09D 4/06* | (2006.01) | |
| *C08F 290/02* | (2006.01) | |
| *C09D 4/00* | (2006.01) | |
| *C09D 11/107* | (2014.01) | |

(52) U.S. Cl.
CPC .......... *C09D 11/101* (2013.01); *C08F 290/02* (2013.01); *C09D 4/00* (2013.01); *C09D 4/06* (2013.01); *C09D 11/107* (2013.01)

(58) Field of Classification Search
CPC ............................ C09D 11/101; C08F 290/02
See application file for complete search history.

(56) References Cited

U.S. PATENT DOCUMENTS

| 4,370,403 A | 1/1983 | Takaki |
| 6,559,222 B1 * | 5/2003 | Rooney ..................... C08J 3/16 |
| | | 524/556 |
| 6,772,683 B2 | 8/2004 | Laskin et al. |
| 2003/0154871 A1 | 8/2003 | Laskin et al. |

FOREIGN PATENT DOCUMENTS

| EP | 0287019 | 10/1988 |
| GB | 2257711 | 1/1993 |
| WO | WO 99/19369 | 4/1999 |

OTHER PUBLICATIONS

PCT International Search Report issued in PCT/US2003/14293 dated Jan. 8, 2003.

* cited by examiner

*Primary Examiner* — Wenwen Cai
(74) *Attorney, Agent, or Firm* — Charles C. Achkar; Ostroelenk Faber LLP.

(57) ABSTRACT

The present invention discloses an energy curable, single phase, aqueous composition comprising water, an ethylenically unsaturated oligomer, and an ethylenically unsaturated resin containing neutralized acidic or basic functional groups. Advantageously, in certain embodiments, the compositions contain greater than 25 wt. % water at less than 60 wt. % resin in the total composition.

27 Claims, 2 Drawing Sheets

SINGLE PHASE WATER BASED ENERGY CURABLE COMPOSITIONS AND METHOD OF PREPARING COATINGS AND PRINTING INKS

CROSS REFERENCE TO RELATED APPLICATIONS

This application is a continuation application of U.S. application Ser. No. 11/919,506, filed Oct. 29, 2007, which is a national stage filing of corresponding international application number PCT/US2003/014293, filed on May 6, 2003, which claimed priority to and benefit of U.S. Application No. 60/380,081, filed on May 6, 2002, each of which is hereby incorporated by reference in its entirety.

FIELD OF THE INVENTION

This invention relates to water based, energy curable compositions useful for preparing coatings and printing inks.

BACKGROUND OF THE INVENTION

Description of Related Art

Energy curable coating and ink compositions are typically composed of mixtures of acrylated derivatives such as oligomeric acrylates and monomeric acrylates. In most instances, the monomeric materials are employed in the composition to control the viscosity of the coating or ink formulation depending on the particular method of application. However, these monomers often do not react completely during polymerization upon energy curing. Unreacted monomers remain as residual components in the dried printing ink or coated film and are subject to migration by absorption as well as surface contact. This migration of residual components can lead to a host of problems such as "odor" and "off-taste" in sensitive packaging applications such as food packaging. Alternatively, solvents are used to reduce or manipulate the formulation viscosity for appropriate applications. However, the use of solvents is often associated with unacceptable emissions, toxicity, and/or odor levels for more sensitive product applications.

The undesirable characteristics of residual solvents and monomers in specialized coatings and inks has spurred advancement of water based, energy curable compositions, aqueous based curing, and the development of energy curable processes in the presence of water. While typically a poor solvent for organic compounds and having too high surface tension to wet many polymer substrates, water in this instance may nevertheless be the ideal solvent for coating and ink delivery, able to lower viscosity and volatilize without adding to emissions, toxicity, or odor. The challenge is to formulate water compatibility over a wide range of compositions without producing water sensitivity and low rub resistance after curing.

An example of an energy curable composition can be found in EP 287,019. This reference, describes a composition wherein the oligomer is a carboxylic acid containing reaction product of a styrene maleic anhydride copolymer and a hydroxy(meth)acrylate. The composition further contains an ethylenically-unsaturated reactive diluent, a photoinitiator, and optionally a thiol. Exposure of the composition to an actinic source, e.g. a UV light source, results in an aqueous-developable material useful in making printing plates and photoresists. Such a composition would be less useful as a protective coating or a binder in ink specifically due to the designed sensitivity to aqueous development which would lead to low rub resistance when contacted by water.

Another example of an aqueous developable, energy curable composition can be found in EP 287,020. This reference describes an oligomeric material as the reaction product of a mono(meth)acrylate derivative of a caprolactone diol and styrene-maleic anhydride copolymer. The composition further optionally contains a reactive diluent and a photoinitiator. Exposure of the composition to a source of actinic radiation results in a solid cured product useful for making printing plates and photoresists wherein the exposed compositions are developed using an alkaline aqueous developer. Again, such a composition would be less useful as a protective coating or ink binder due to its water sensitivity.

In neither of the above cases is delivery of the composition by aqueous solution actually described. U.S. Pat. No. 5,665,840 discloses a water soluble, crosslinkable prepolymer having in its copolymer chain, as monomeric structural units, a vinyl lactam; a vinyl alcohol; optionally a lower alkane number carboxylic acid vinyl ester; a vinyl crosslinking agent; and optionally a vinylic photoinitiator. This reference also discloses a process for making prepolymers, as well as crosslinked, water insoluble, polymeric networks particularly useful for making hydrogels and water absorbing, molded articles such as contact lenses. Because these cross-linked, water insoluble, polymeric networks swell with water, they would be unsuitable as cured protective coatings and ink vehicles where they would exhibit low resistance to mechanical abrasion when in the presence of moisture.

U.S. Pat. No. 4,745,138 discloses a class of low molecular weight, partial esters of anhydride containing copolymers capable of providing non-aqueous, energy curable, liquid compositions for production of radiation-hardenable coatings without the need to employ an inert organic solvent. These compositions employ monomers containing terminally ethylenically unsaturated groups and maleic anhydride copolymers characterized by having free anhydride functionalities and are said to be particularly suitable for improving adhesion and the dispersive capabilities of binder resins. The partial esters are produced by esterifying a fraction of the anhydride groups by ring-opening with a hydroxy alkyl acrylic compound or an admixture thereof with a monohydric alkyl alcohol. By virtue of the introduction of hydrophobic substituents (particularly the esters of monohydric alkyl alcohols) and the absence of carboxylic acid groups, these compositions cure to films which are more water- and solvent-resistant than those made in accordance with the previous references. However, not discussed in this patent are aqueous solutions of these polymers as provided by hydrolysis of the residual anhydride in dilute caustic, the use of these solutions to stabilize solutions or colloidal dispersions of other, less polar materials, or coating or ink compositions prepared with these solutions.

A parallel approach uses solutions of acrylated, hydrophilic oligomers alone or together with the fore-mentioned polymers. Acrylated oligomers (and solutions of polymer resins made with oligomers) have a viscosity that is typically too high to be used directly for making coatings and printing inks. The use of water as a diluent to lower the viscosity of energy curable, acrylated, oligomeric mixtures has been described in U.S. Pat. No. 6,011,078 wherein the mixtures are used for wood and floor coating applications. The formulations taught in this patent are dispersions or emulsions and require prior evaporation of water followed by exposure to a temperature above the minimum film formation temperature (MFFT) before exposure to the actinic source. Without film formation prior to cure, the resultant energy cured, crosslinked polymer has very weak coherence, lacks adherence to a substrate, and does not provide the rub resistance required. Further, the additional drying step(s) slow the press speed and increase the potential for causing surface defects (e.g., lower gloss).

Acrylic functional polyesters containing salt structures are described by M. Philips, J. M. Loutz, S. Peeters, L. Lindekens, Polymers Paint Colour J., 183, #4322, p. 38 (1993). These are combined with hydrophilic monomers (e.g., polyethyleneglycol diacrylates) and water to make radiation curable, protective coatings. The combinations are described as homogeneous solutions that can be coated and radiation cured by UV with water-soluble photoinitiators to give rub- and wash-resistant top-coats. Also, see J. M. Loutz, S. Peeters, L. Lindekens, J. Coated Fabrics, 22, p. 298 (1993). In reality, all these formulations are very limited in the amount of water that can be incorporated and are comprised of high resin mass fraction (greater than 65 wt. % of vehicle) with consequently high viscosity. Typically, greater than 30 wt. % water on a total liquids (vehicle) basis causes degraded performance in the examples provided. Due to this fact, less than 10 wt. % water is recommended; and even at this water content, "a thermal flash-off step is recommended in order to avoid the formation of microporosity in the film."

To make water based coatings and inks that: do not require drying prior to cure, cure to well-adhered, offer rub-resistant films, and are characterized as low-odor and low-extractable, single phase mixtures of highly-functional, acrylated oligomers and polymers in aqueous solution or in a thermodynamically stable aqueous microemulsion at viscosities below 500 cP (25 deg C., 10 s-1) as tolerated on typical presses (e.g., flexo, gravure, and rotary screen) are needed. The formulation of such systems to contain both hydrophilic and hydrophobic components, highly functional polymers and oligomers, and at water levels exceeding 25 wt. % (not including dispersed solids) to provide control of viscosity without sacrifice of cure speed is a challenge not met in the prior art.

SUMMARY OF THE INVENTION

The invention is an energy curable, single phase, aqueous composition comprising water, an ethylenically unsaturated oligomer, and an ethylenically unsaturated resin containing neutralized acidic or basic functional groups. Preferably, the components are in such proportions and structures as to achieve greater than 25 wt. % water at less than 60 wt. % resin in the total liquid mass.

In one embodiment of the invention, an energy curable, single phase, aqueous composition is comprised of water and an ethylenically unsaturated resin containing neutralized acidic or basic functional groups. Preferably, these components are in such proportions as to achieve greater than 26 wt. % water in the total liquid mass.

A further embodiment of the invention is an energy curable, aqueous, printing ink composition comprising a colorant in a single phase vehicle having as its components water, an ethylenically unsaturated oligomer, and an ethylenically unsaturated resin containing neutralized acidic or basic functional groups. Preferably, these components are in such proportions and structures as to achieve greater than 25 wt. % water at less than 60 wt. % resin in the vehicle portion.

A further embodiment of the invention is an energy curable, aqueous printing ink composition comprising a colorant in a single-phase vehicle having as its components water and an ethylenically unsaturated resin containing neutralized acidic or basic functional groups. Preferably, these components are in such proportions as to achieve greater than 40 wt. % water in the vehicle.

The conditions under which the described compositions are defined as single phase are given by the temperature, humidity and pressure in the environment prevailing at the moment of cure. In addition, it is preferred that the liquid vehicles of the compositions also be single phase at ambient temperature, humidity, and pressure.

A further embodiment of the invention is a method for forming an energy cured, water resistant coating on a substrate comprising: coating a substrate with an energy curable, aqueous coating composition, as described herein, then subjecting the coated substrate to an actinic source prior to removal of the water thereby forming an energy cured, water resistant coating.

A still further embodiment of the invention is a method for printing using an energy curable, aqueous composition by applying to a substrate the energy curable, aqueous ink compositions as described herein then subjecting the substrate to an actinic source prior to removal of the water thereby forming an energy cured, water resistant, printed product.

BRIEF DESCRIPTION OF THE DRAWINGS

The invention can be more fully understood by use of the accompanying drawings.

FIG. 1 is one face of this tetrahedron (where the mass fraction of component D is zero). We are interested in the low viscosity, single phase regions that contain D in this diagram.

DETAILED DESCRIPTION OF THE INVENTION

Figure 1:
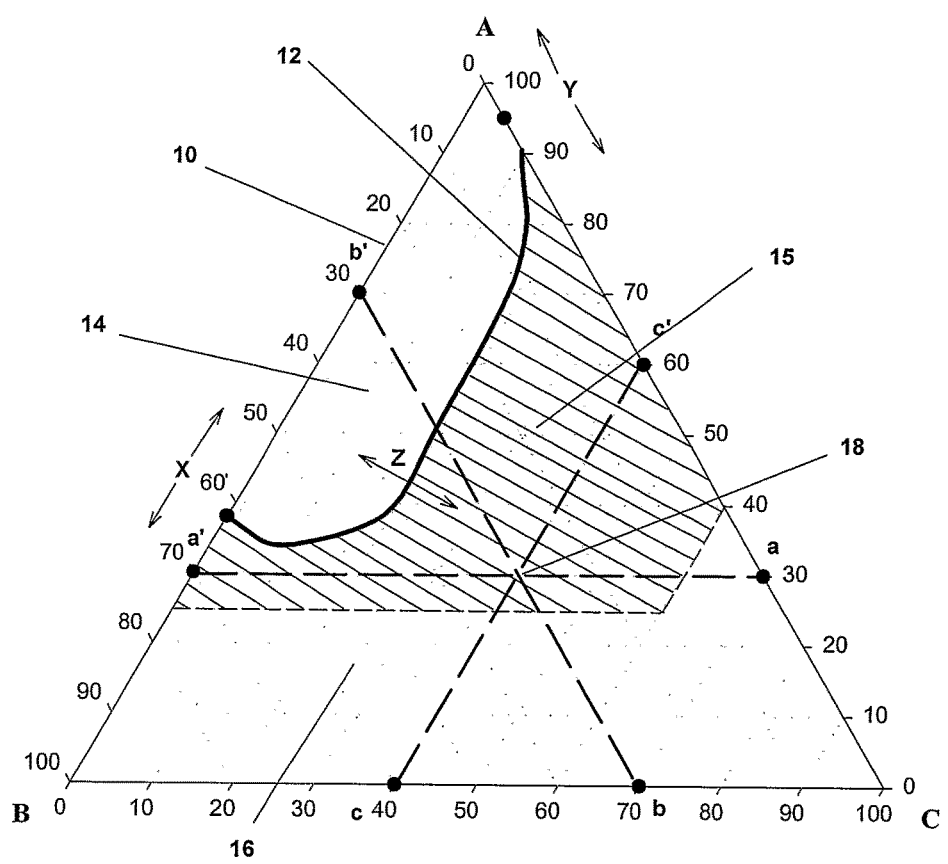
FIG. 1 is a three-component, triangular, phase diagram in which the components are: (A) water; (B) a partially water soluble oligomer; and (C) a water-soluble, ethylenically unsaturated resin. Each vertex is a pure component and each point on and within the diagram corresponds to a mass fraction (or expressed as wt. %) of each of the three possible components such that the sum of mass fractions is 1.0 (or 100 wt. %). Each mass fraction is read by construction of three lines parallel to the side opposite the vertex for the pure component in question and reading off the intersection of these lines (e.g., a-a', b-b', c-c' for point (18)) on the binary blend scales which are the sides of the figure. We are interested in the low viscosity, single phase regions in this diagram.

The present invention teaches the preferred use of single phase, aqueous, energy curable compositions in the manufacture of coatings and printing inks. These single phase compositions may be formed as ternary or quaternary solutions or as microemulsions comprised of (A) water; (B) water soluble oligomers; (C) water soluble, ethylenically unsaturated resin; and optionally, (D) a water insoluble oligomers. These components are preferably in such proportions and structures as to achieve greater than 25% wt. % water in the total liquid (vehicle) portion with less than 60 wt. % of the solubilizing resin. In the single-phase solutions of the present invention, the resin contains neutralized acidic or basic functional group which renders it soluble in the final aqueous composition. Further, in the present invention the proportion of water may be freely adjusted so as to achieve any target application viscosity and assure complete cure in processes where drying and curing occur simultaneously without inerting.

In the present invention, as in the prior art, water is used largely as a diluent to control the viscosity of the composition. But in contrast to prior art coating formulations, the invention demonstrates a way to extend the compatibility of water in the composition to a much higher level than previously achieved. With an increase in water compatibility, we are able to use water to create low odor formulations since we can now use higher molecular weight (meth) acrylated components while still maintaining an appropriately low viscosity. The resin is completely soluble in water when even partially neutralized, and it is so structured so as to allow for a single phase mixture (i.e. solutions) of ingredients by functioning as a "solubilizing" aid. To accomplish this, the resin comprises both hydrophobic and hydrophilic segments. Only the water insoluble oligomer of the major components listed does not contribute to stabilize an aqueous, single phase composition. Instead, its level is allowed for by the incorporation of hydrophobic elements into the resin and the partially water soluble oligomer.

As used herein the term "solution" is intended to have its conventional meaning as a homogeneous, single phase mixture formed by dissolving one or more substances into another substance, i.e. a single phase liquid or solid. As used herein the term "miscible" is intended to mean that two or more components form a single phase solution. As used herein the term "water soluble" is intended to mean that a component is miscible in water over an extensive concentration range, e.g., 0-90 wt. % water or more in the total mass of the liquid (vehicle) portion, to form a single phase, binary, aqueous solution. As used herein the term "partially water soluble" is intended to mean that a component is miscible in water only over a limited concentration range, e.g. 0 to 70 wt. % water, in forming a single phase aqueous solution.

As used herein the term "microemulsion" is used to describe a clear, homogeneous, thermodynamically-stable, colloidal suspension of such small particle size that all the attributes of a true solution apply (except perhaps for the wavelength of maximally scattered light). From this point, the term solution will imply that the described result may also be achieved by a thermodynamically stable microemulsion. This description is not to be confused with a metastable emulsion (as, for example, in an emulsion polymer), a coarser dispersion which is not truly thermodynamically stable but only kinetically stable. This does not imply that such kinetically stable emulsions are not useful in admixture with the inventive solution, but that the base of the formulation is a solution of the components discussed within which a fourth or fifth emulsified component may be dispersed.

The term "energy curable", as used herein, is intended to mean a free radical, addition-cured, hardened, polymerizable, or crosslinkable composition, material, or system or any addition-cured, hardened, or crosslinkable composition, material, or system, wherein the curing, hardening, polymerizing, or crosslinking occurs by action of an actinic radiation source such as ultraviolet light (UV), electron beam radiation (EB), and the like. As used herein "actinic radiation" is defined in its broadest sense as any radiation that is capable of exposing photographic film.

Free radical photoinitiating systems can be incorporated within the addition-cured systems of the single phase solutions of the present invention in order to enhance the curing. Colorants can be incorporated using the single phase solutions of the invention as a vehicle to produce water-based inks having excellent rheology and suitable for a wide range of printing applications from ink jet to higher viscosity paste ink applications. The temperatures at which coating compositions are typically stored and used are about room temperature. Accordingly, those solutions stable at ambient temperature are desirable and achieved within the scope of the present invention. In addition, we require that the composition also be single phase at the temperature pertaining at the point of cure.

Figure 2:
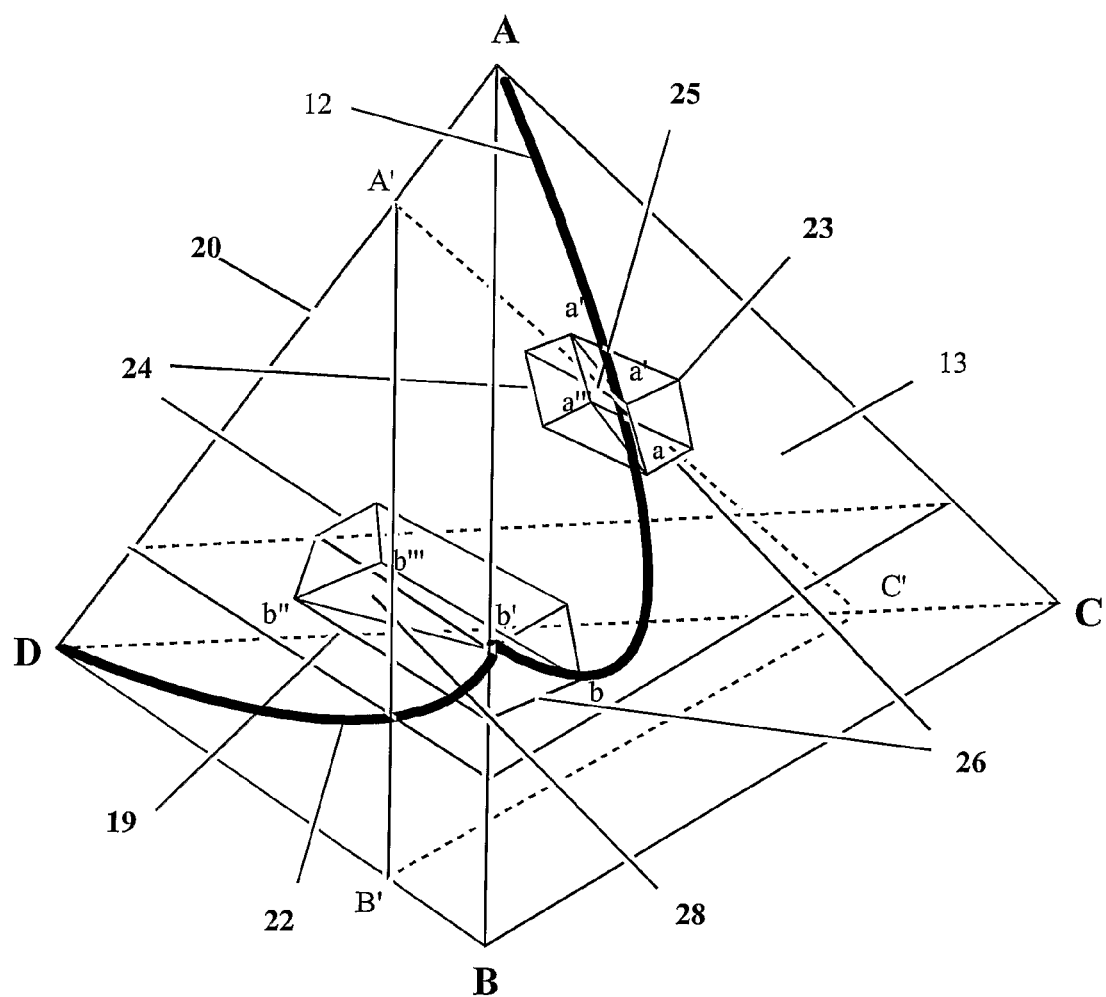
FIG. 2 is a four-component, tetrahedral, phase diagram in which the components are: (A) water; (B) a partially water soluble oligomer; (C) a water soluble, ethylenically unsaturated resin; and (D) a water insoluble oligomer. Again, each vertex is a pure component and each point on or within the diagram corresponds to a mass fraction (or expressed as wt. %) of each of four components such that the sum of mass fractions is 1.0 (or 100 wt. %). The mass fractions are read by the intersection of planes parallel to face opposite the vertex for the pure component in question with the binary blend scales that are the sides of the figure.

The energy curable coating compositions of the present invention may be more fully understood from the following description provided in connection with FIGS. 1 and 2 of the accompanying drawings. Throughout the description herein, similar reference characters refer to similar elements in all figures. The term component includes single molecular species (pure components) and mixtures of similar components termed pseudocomponents that partition between phases in the multiple phase regions of the phase diagram without alteration of the relative abundance of each component of the pseudocomponent in each phase. Also as used herein, the term "major component" is intended to mean a component (or pseudocomponent) having greater than 5 wt. % concentration in the compositions of the present invention. The figures contained in the drawings are intended only as illustrations of the ternary and quaternary, aqueous, energy-curable compositions of the present invention and are not necessarily drawn to scale or to reflect any actual phase transition boundary between phase regions in the phase diagram.

The region of most interest in the triangular phase diagram (10) in FIG. 1 is enclosed by the cross-hatched trapezoidal fragment (15) with its high resin content limited by the 60 wt. % resin line; its low resin content defined by the cloud point curve (12); its low water side by the 25 wt. % water line; and its high water side by the resin/water binary (line (A-C). Over this region, the composition is single phase and inventive. The viscosity can be varied by varying the water and/or resin mass fractions to match that required by the press speed and the application technique. Curing is rapid by virtue of the lower oxygen solubility in this region.

The phase transition boundary (12), i.e. the cloud point curve, defines the component concentrations at which the ternary mixture transitions from two phases in region (14) to a single-phase in the sum of regions (15) and (16). It is understood that the phase transition boundary (12) may assume any shape: Further, its placement within the phase diagram (represented by the arrows "<---------->" about points x, y, and z), depends on the specific partially water-soluble oligomer and specific resin chosen in the ternary mixture as well as other factors such as the exact temperature at the point of cure, the pressure in the nip, and interaction with other non-major components of the composition such as wetting agents and photoinitiators.

The solubility in water of the partially water-soluble oligomer and the water-soluble resin is further illustrated by the binary mixture portion of the diagram represented by base (A_B) and base (A_C), respectively. The water/partially water-soluble oligomer mixture concentrations are defined by points along base (A_B) which contains the cloud point X where a single phase solution converts to a two-phase mixture. Thus, mixtures falling within the base segment (A_X) are two-phase mixtures, while the mixtures falling within the base segment (X_B) are single-phase solutions in this illustration. Accordingly, the oligomer may be termed "partially water soluble" for the purposes of this invention when the quantity represented by the line segment (A_X) is greater than 30% of the total segment (A_B).

The water/water-soluble solubilizing resin mixture concentrations are defined by points along base (A_C) which contains the cloud point Y where a single phase solution converts to a two phase mixture. Thus, mixtures falling within the base segment (A_Y) are two phases, while mixtures falling within the base segment (Y_C) are single phase solutions. Accordingly, the resin may be termed "water soluble" when the quantity represented by the line segment (Y_C) is greater than 30% of the total line segment (A_C).

In FIG. 2, an additional component D, the water insoluble oligomer, has been added. FIG. 1 is reproduced in FIG. 2 as the forward-most triangular face of the tetrahedral phase diagram (20) where the mass fraction of D is zero. The cloud point curve (12) is also illustrated in this face. Another important phase boundary (22) is shown on the A-B-D face which shares one point on the A-B binary with the previously discussed cloud point curve and extends to point D. Referring to the internal box-like volume segments (19) and (23) of the tetrahedral phase diagram, the phase-transition boundary surface segments b-b'-b"-b" (28) and a-a'-a"-a" (25) represent regions of an internal cloud point surface which defines the component concentrations at which the phase-transition for the quaternary mixture occurs from two phases in concentration region (24) to a single-phase in concentration region (26) summed over the entire diagram. It is understood that the phase-transition boundary may assume any shape. Further, its placement within the phase diagram depends on the specific partially water-soluble oligomer, resin, and water-insoluble oligomer employed in the quaternary mixture as well as other factors such as the exact temperature and the interaction with other non-major components of the composition.

Water

A major component of the compositions of the present invention is water. Water functions as an odor-free diluent used to adjust the viscosity of the composition. Further, water in such quantities as to be retained whole or in part in the applied liquid at the point of cure provides the polymer segment mobility needed for a high degree of cure. And finally, the decreased solubility of oxygen in aqueous media contributes to a rapid rate of cure in the absence of inerting. All these benefits are increased as the proportion of water in the formula is increased. The viscosity's of these solutions can all be adjusted by adjusting the proportions of the miscible diluent and the remaining oligomer provided that the resulting liquid remains a single phase liquid, preferably with water fractions greater than 25 wt. % in the single-phase liquid. The latter is an important point not only for the freedom to adjust viscosity but also in order that water above a certain limit be provided at the point of cure to maintain fluidity and low oxygen tension when curing and drying are occurring simultaneously.

Water Soluble Ethylenically Unsaturated Oligomer

The water soluble oligomer (or the partially water soluble oligomer, vide infra) functions as a lower molecular weight extender. It is typically multifunctional, comprising at least two (meth)acrylate groups. The major requirement other than solubility is that it rapidly builds into the network after initiation of polymerization. The wt. ratio of resin to water-soluble oligomer extender generally ranges from 2.0 to 0.2, preferably 1.0 to 0.4, and most preferably 0.7 to 0.6. The exact choice depends on the structure of both the resin and the oligomeric extender and the type of property most desired (e.g., scratch resistance or water resistance).

The water soluble oligomer preferably forms an aqueous solution within restricted proportions of the oligomer/water components. Thus, a "partially water soluble oligomer" is an oligomer that is miscible in water but only over a limited concentration range, e.g. 0-70 wt. % water in the total mass, to form a single phase aqueous solution. As defined earlier in reference to base segment (A_B) in the accompanying figures, an oligomer is "partially water soluble", as defined by the phase diagram, when the quantity of oligomer represented by the line segment (A_X) is greater than 30% of the base segment (A_B). Typically, line segment (A_X) ranges between 30% to about 90% of the total base segment (A_B).

The water soluble oligomer is a further characterized as a monomer or macromer containing ethylenic unsaturation and which can be polymerized or cross-linked by free radical polymerization. It also contains sufficient water-solubilizing groups such as hydroxyl groups, ethylene oxide segments, and the like to assure at least 5% water uptake in the oligomer/water binary. Preferably, the water soluble oligomer is, for example, selected from acrylates, methacrylates or combinations thereof. Typically, the water soluble oligomer will contain one or more acrylate or methacrylate groups. Acrylates or methacrylates useful as water soluble oligomers in the present invention may, for example, be selected from the group consisting of epoxy acrylates, epoxy methacrylates, polyether acrylates, polyether methacrylates, polyester acrylates, polyester methacrylates, polyurethane acrylates, polyurethane methacrylates, melamine acrylates, melamine methacrylates, ethoxylated trimethanolpropane acrylate, ethoxylated trimethanolpropane methacrylate, ethoxylated di(trimethanolpropane) acrylate, ethoxylated di(trimethanolpropane) methacrylate, ethoxylated pentaerythritol acrylate, ethoxylated pentaerythritol methacrylate, ethoxylated dipentaerythritol acrylate, ethoxylated dipentaerythritol methacrylate, ethoxylated neopentaglycol acrylate, ethoxylated neopentaglycol methacrylate, ethoxylated propylene glycol acrylates, ethoxylated propylene glycol methacrylates, polyethylene glycol diacrylates and polyethylene glycol dimethacrylates. Particularly preferred oligomers are alkyl epoxy acrylates and alkyl epoxy methacrylates.

The water soluble oligomer component may be a single oligomer or a combination of two or more oligomers as described above. In the case, a combination is used, a single pseudocomponent (B') is substituted for the pure component (B) in the phase diagram without any additional condition. The employment of pseudo-components to simplify phase diagrams is well known in the art.

Typically, where the oligomer is a partially water soluble oligomer, it accepts at least 5% water to form an aqueous solution, and preferably accepts 10% or more water.

In addition, the water soluble oligomer may be too compatible with water (line (A_X) less than 30% of line (A_B) in FIG. 1). When the water soluble oligomer (or the blend of water-soluble oligomers) is present in greater than 50 wt. % of the total solids obtained by evaporation of the water from the total liquid (vehicle), the water-soluble oligomer (or the blend) should accept no more than 70 wt. % water in a binary (or pseudo-binary) oligomer-water, single phase liquid solution. The result of too high water compatibility is that the water resistance of the final cured film will be degraded.

Water Soluble, Ethylenically Unsaturated Resin

The water soluble, ethylenically unsaturated resin forms a stable, single phase composition with extensive proportions of the oligomer I water binary components, comprising at least 10 to 80 wt. % or more water in the total liquid. As defined earlier in reference to the line segment (A_C) in the accompanying figures, a resin is "water soluble" if, as defined by the phase diagram, the quantity represented by the line segment (C_Y) is greater than 30% of segment (A_C). Typically, line segment (C_Y) ranges between 60% to 95% of the total base segment (A_C), although the water soluble resin may form single phase solutions throughout the concentration range represented by the total segment (A_C).

The word resin has its usual connotation for ink and coatings, i.e., a hard solid polymer showing properties typical of higher molecular weight provided by hydrogen-bonded structures without actually being high molecular weight. The preferred weight average molecular weight is greater than 1000 but less than 100,000 daltons, more preferably greater than 1000 but less than 50,000 daltons, and most preferably greater than 1000 but less than 10,000 daltons.

Further, in the present invention, the water soluble resin is a particular type of surface-active material that functions as a "solubilizing" agent, capable of assisting in the dissolution of other water-insoluble components into aqueous solution. It does this by chemically incorporating substantial hydrophilic (e.g., ionic and hydrogen-bonding groups such as carboxyl) and hydrophobic (e.g., hydrocarbon) structures (as pendant groups or as main chain segments). For example, the resin may have acid-functional groups (e.g. pendant carboxylic acid groups) which are partially or totally neutralized with a base (e.g., an amine) to form a water-soluble resin salt. Alternatively, the polymeric resin may have basic functional groups (e.g. amino groups) which are partially or totally neutralized with an acid (e.g. a carboxylic acid) to form a water soluble resin salt. Preferably, the resin contains at least two acrylic groups, methacrylic groups, or a combination thereof, per molecule; more preferably three to five per mole; and most preferably more than six such functions per mole. The carboxylic acid functional groups, which are neutralized with a base, are in such number as to generate an acid number of greater than 80 (mg of KOH to completely neutralize 100 g of resin) to assure water solubility over at least a portion of the water/resin binary. And preferably, the resin also contains hydrophobic substituents (e.g., esters of aliphatic alcohols) to an extent that generates good pigment dispersing properties, water resistance, and properties consistent with the above requirements. Thus a preferred ethylenically unsaturated resin is a neutralization product of a base with an energy curable polymer or resin containing carboxylic acid groups; acrylic groups and/or methacrylic groups; and esters of hydrophobic alcohols, wherein the neutralization product is a water soluble, acrylated, resin salt.

A particularly preferred energy curable resin is a styrene/maleic anhydride copolymer partially esterified with a hydroxy alkyl acrylate or methacrylate, (e.g., hydroxyethyl acrylate, hydroxyethyl methacrylate, hydroxybutyl acrylate, or hydroxybutyl methacrylate) and a medium chain-length aliphatic alcohol (e.g., n-propanol, n-butanol, amyl alcohol, isoamyl alcohol, and the like). By increasing the proportion of hydroxybutyl (meth)acrylate to hydroxyethyl (meth)acrylate, the proportion of methacrylate to acrylate, the proportion of normal (unfunctional) alcohol to functional or branched alcohol, and the proportion of longer-chain alcohol to shorter-chain alcohol, the hydrophobicity of the resin can be increased. In addition, by decreasing the proportion of total esterification, increasing the extent of neutralization of the acid groups by caustic, or by the choice of more highly hydrated caustic (e.g., lithium hydroxide), the hydrophilicity can be increased. By use of these tools, the resin can be made to be water-soluble, to stabilize colloidal dispersions and solutions of water-insoluble oligomers, to stabilize pigment dispersions, and yet to resist water in the final cured product.

An example of an energy curable polymer of this type is disclosed in PCT International Patent Application WO 99/19369, which is incorporated herein by reference. Accordingly, a preferred resin salt is a resin concentrate containing 39-41 wt. % resin solids in water and neutralized with ammonia to a pH of 6.5. The resin is energy curable having the general structure:

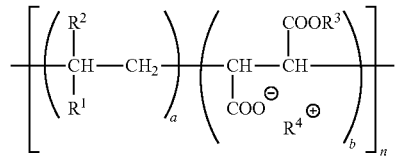

a, b = 1-10

$R^1$, $R^2$=H, $C_1$–$C_{18}$ Alkyl, Phenyl, Toluyl, $C_7$-$C_{14}$ Alkaryl, $C_4$-$C_{12}$ Cycloalcyl, Cl, F, Br $R^3$=$C_1$–$C_{18}$ Alkyl, $C_4$-$C_{12}$ Cycloalcyl, $C_3$-$C_{10}$ Polyester, $-(CR^6HCH_2^-O)_n^-R^7$, $-(CH_2CH_2CH_2CH_2^-O)_n^-R^7$, $-R^5$-OCOCHR$^6$=CH$_2$ $R^4$=H, Ammonia, Amine, Alkalimetal $R^5$=$C_1$–$C_{18}$ Alkyl, $-(CR^6HCH_2^-O)_n^-$, $-(CH_2)_4$ COOCH$_2$CH$_2^-$, $C3$-$C_{10}$ Polyester, $-CH(OR^3)$ CH$_2$OC$_6$H$_4$OCH$_2$C(OR$^3$)CH$^-$R$^6$, $R^7$=H, $C_1$-$C_5$ Alkyl While any basic compound (e.g., alkali metal hydroxides such as sodium hydroxide, potassium hydroxide, or lithium hydroxide or amines such as ammonia, alkyl amines, or amine-containing oligomers) may be used to neutralize the acidic groups of the resin, ammonia, amines or combinations thereof, are preferred. A preferred base is selected from tertiary amines. In a particularly preferred embodiment, the base is an ethylenically unsaturated tertiary amine as described in U.S. Pat. No. 6,559,222. With selected, alcohol functional, ethylenically unsaturated, tertiary polyamines as neutralizing agents, the acid groups on the resin may be totally neutralized to form a cross-linkable, water soluble ionomer. The ethylenically unsaturated tertiary amine provides the counter ion of the acidic resin and allows the ionomer formed to "stereo" polymerize during photoreaction to form an additional cross-linked network over the ethylenically unsaturated groups as well as over the ionic structure. Unlike other water based, energy curable, resin technologies (wherein the water resistance is imparted to the resin film by the evaporation of ammonia, for example, which shifts the acid base equilibrium in the post-cured material), here by using an ethylenically unsaturated base, the neutralized resin forms an additional cross-linked network instantly on both sides of the ionomer by radiation induced free radical addition polymerization. The result is an energy cured film having enhanced solvent and water resistance from the interpenetrating network of covalent and ionic bonds and improved gloss from more rapid surface cure.

Water Insoluble Ethylenically Unsaturated Oligomers

The water insoluble oligomers suitable for use in the present invention are energy curable and form two phase mixtures with water within extensive proportions of the water insoluble oligomer/water binary composition space (line segment (A-D) in FIG. 2). As defined earlier in reference to the line segment (A_D) in the accompanying FIG. 2, the water insoluble oligomer is typically insoluble over the total water/oligomer concentration range represented by the segment (A_D). However, an oligomer which is capable of incorporating 5 wt. % water or less is also included as water insoluble for the purpose of this invention.

While the water insoluble oligomer typically is totally immiscible in water, the water insoluble oligomer may form a solution with the water soluble oligomers within extensive proportions of the (water insoluble oligomer)/(water soluble oligomer) binary compositions. The water insoluble oligomer is preferably miscible in the water soluble oligomer over an extensive concentration range, e.g., 5 to 95 wt. % water insoluble in the total blend, to form a single phase, binary solution. Typically, the water insoluble oligomers are compounds (or mixtures of similar compounds), which have one, two, or more terminal ethylenically unsaturated groups. Representative of such compounds, for example, include: dipropylene glycol diacrylate; tripropylene glycol diacrylate; butanediol diacrylate; hexanediol diacrylate; alkoxylated hexanediol diacrylate; trimethyol propane triacrylate; alkoxylated trimethylol propane triacrylate; di(trimethylol propane triacrylate); glycerolpropoxy triacrylate; pentaerythritol triacrylate; alkoxylated pentaerythritol triacrylate; di(pentaerythritol triacrylate); neopentaglycol diacrylate; alkoxylated neopentaglycol diacrylate; dipropylene glycol dimethacrylate; tripropylene glycol dimethacrylate; butanediol dimethacrylate; hexanediol dimethacrylate; alkoxylated hexanediol dimethacrylate; trimethyol propane trimethacrylate; alkoxylated trimethylol propane triamethcrylate; di(trimethylol propane methtriacrylate); glycerolpropoxy trimethacrylate; pentaerythritrol trimethacrylate; alkoxylated pentaerythritrol trimethacrylate; di(pentaerythritrol trimethacrylate); neopentaglycol dimethacrylate; alkoxylated neopentaglycoldimethacrylate; and the like and combinations thereof. The water-insoluble oligomer may contain a combination of diacrylic and triacrylic monomers along with a monomer containing a single terminal ethylenic group. The water insoluble oligomers may be acrylated epoxy resins; bis acrylic esters of bisphenol A; acrylated polyurethanes; acrylated polyesters; acrylated polyether and the like. Preferred water-insoluble oligomers of this type include di-(3-methacryloxy-2-hydroxypropyl ether of bisphenol-A; di(2-methacryloxyethyl ether of bisphenol-A; di-(3-acryloxy-2-hydroxypropyl ether of bisphenol-A; di(2-acryloxyethyl ether of bisphenol-A; and the like.

Binary Single Phase Aqueous Solutions Containing Resins

A binary, single phase, aqueous embodiment of this invention is an energy curable, single phase, aqueous composition comprising a single phase solution of water and a water soluble, ethylenically unsaturated resin salt wherein the resin salt is comprised of, for example, the neutralization product of ammonia, an amine or an ethylenically unsaturated tertiary amine and an ethylenically unsaturated resin containing acidic-functional groups. As discussed previously in connection the water soluble, ethylenically unsaturated resin salt, the ethylenically unsaturated resin contains acrylic groups, methacrylic groups or a combination thereof and is neutralized by ammonia, an amine or an ethylenically unsaturated tertiary amine to form the resin salt. The nature of the water soluble, ethylenically unsaturated resin salt and the water soluble oligomer has been discussed above, and those discussions apply to this embodiment of the invention.

Ternary Single Phase Aqueous Compositions Containing Water Soluble Oligomers and Resins FIG. 1 illustrates the ternary, single phase, energy curable compositions of this invention. This embodiment is an energy curable, aqueous composition comprising a single phase solution of water; a free radical addition-polymerizable, water soluble oligomer or alternatively a partially water soluble oligomer; and a water soluble, ethylenically unsaturated resin salt. The general nature of this embodiment was discussed above. Likewise, the natures of the water soluble, ethylenically unsaturated resin salt and the water soluble oligomer have been discussed above. These discussions apply to this embodiment of the invention.

The limit of water solubility of the oligomer is expressed by the position of Point X in FIG. 1. In this invention, it is preferred that X comprise more than 10 wt. % and less than 70 wt. % water and most preferred that X comprise more than 20 wt. % and less than 40 wt. % water. If point X comprises less than 10 wt. % water (is too close to point B), the two-phase region ((14) in FIG. 1) will be too large, extending so far towards point C at point Z that the resulting single phase solutions above point Z become too viscous for use in common graphic arts applications. Similarly, if point X comprises more than 70% water, the resulting cured polymer will be too water-sensitive to be useful as a protective coating.

The preferred ternary compositions comprise stable, single phase compositions within region (15) in phase diagram (10) of FIG. 1. The properties of the preferred compositions within this region can be adjusted by the choices of oligomer A and resin C as will be apparent from the Examples, below.

Quaternary Single Phase Aqueous Compositions Containing Water Insoluble Oligomers Water Soluble Oligomers and Resins FIG. 2 illustrates the quaternary, single phase, energy curable solutions of this invention. This embodiment is an energy curable, aqueous composition comprising a single phase composition of water; a free radical addition-polymerizable, water soluble oligomer or, alternatively, a partially water soluble oligomer; a free radical addition-polymerizable, water insoluble oligomer, and a water soluble, ethylenically unsaturated resin salt. The general nature of this embodiment was discussed above. Likewise, the nature of the water soluble, ethylenically unsaturated resin salt, the water soluble oligomer and the water insoluble oligomer has been discussed above, and those discussions apply to this embodiment of the invention.

The region of most interest in FIG. 2 is a volume of limited extension toward the water insoluble component (D) which originates in the single phase region of face ABC (identical to FIG. 1) near the cloud point curve (12). Its general shape in the (D) direction is indicated by the cloud point curve (22) in the ABD face that quickly limits the water content to below 25 wt. % of the total liquid in the single phase region to the left of the A'B'C' plane (toward higher (D)). Thus the present invention is limited to the region bound between plane NB'C' on the left and the ABC plane on the right, by the 25 wt. % water plane on the bottom and the complex surface which is the cloud point surface which approximately follows the planes (a,a',a",a''') and (b,b',b",b''') summed over the entire tetrahedral space. Alternatively, the extent of the quaternary, single phase region is controlled by the total amount of hydrophobic material component (D) including that portion coming from the partially water soluble component (B) and any coating or curing additive (vide infra) which a given structure and amount of the resin (C) can compatibilize with substantial water.

The addition of (D) to water-rich point (23) transitions from a single phase solution to a composition which is more likely to be an oil-in-water microemulsion (o/w) near the plane (a,a',a",a''') in which the continuous phase is aqueous with microscopically small dispersed domains of (D), smaller in diameter than the wavelength of visible light. Similarly, the addition of (D) to oil-rich point b' near the AB axis transitions from a single phase solution to a composition which is more likely to be a water-in-oil microemulsion (w/o) near the plane (b,b'b",b''') in which the continuous phase is largely oligomer B with microscopically small dispersed domains of (D) dispersed within.

By adjusting the balance between the number and nature of the hydrophobic ester groups (to compatibilize the resin with the water-insoluble oligomer) and the extent and nature of the neutralization of the acid groups (to compatibilize the resin with the water and water-soluble oligomer), the single phase volume within FIG. 2 can be increased. When successful, there exist single phase, quaternary compositions at such proportions that they contain greater than 25 wt. % water and greater than 5 wt. % (D) that are particularly useful in the direct cure of inks and coatings based on these compositions as vehicle without prior drying.

Free Radical Photoinitiator

Any of the previously described energy curable, single phase, aqueous compositions of this invention may contain a photoinitiator. Unless the composition is formulated specifically for use with electron beam curing, the energy curable composition will typically contain an addition polymerization photoinitiator that generates free radicals upon exposure to actinic radiation, such as ultraviolet light. Such a photoinitiator has one or more compounds that directly furnish free radicals when activated by actinic radiation. The photoinitiator may also contain a sensitizer that extends the spectral response into the near ultraviolet, visible or near infrared spectral regions. In free radical initiated curing systems, typically irradiation of a photoinitiator produces free radicals that initiate polymerization and/or crosslinking. Typically, only small amounts of photoinitiator are required to effectively initiate a polymerization, e.g. from about 0.5 wt. % to about 5 wt. % based on the total weight of the polymerizable (curable) solution. Typically, the photoinitiator is readily soluble in at least one of the major components of the energy curable solution; and it is preferably at least partially soluble in water. Still more preferably, the free radical curing system comprises a photoinitiator that is substantially soluble in one or more of the major components in the single phase solution of the present invention. A wide variety of photoinitiators may be used in the aqueous compositions of this invention. Useful photoinitiators of this type are, for example, described in a review by B. M. Monroe and G. C. Weed entitled *"Photoinitiators for Free-Radical-Initiated Photoimaging Systems"*, Chem. Rev. 1993, 93, 435-448, which is incorporated herein by reference. Preferred photoinitiators, suitable for use alone or in combination with other photoinitiators, are Irgacure 1173, Irgacure 500, Irgacure 184, Irgacure 2959 (Irgacure is a trademark and commercially available product of Ciba Specialty Additives, Tarrytown, N.Y.), Esacure KIP 150, Esacure KIP EM and Esacure KIP DP 250 (Esacure is a Trademark and commercially available product of Lamberti, Gallarate, Italy).

Enemy Curable Inks Prepared from Single Phase Aqueous Solutions

As used herein, the term "ink" or "printing ink" has its conventional meaning, i.e., a colored liquid composed of a colorant (which is typically a pigment), dispersed in a liquid vehicle. In particular, the energy curable ink of the present invention comprises: a pigment and an energy curable liquid vehicle being the energy curable, single phase, aqueous compositions of this invention having been fully described above. In particular, the energy curable, liquid vehicle is a single phase, aqueous solution of water, oligomer, and a water soluble, ethylenically unsaturated resin containing neutralized acidic or basic functional groups. As discussed above, the oligomer can either be a partially water soluble oligomer, a water soluble oligomer, or combination thereof. A further alternative energy curable liquid vehicle, comprises an energy curable, single phase, aqueous solution of water and a water soluble, ethylenically unsaturated resin salt having neutralized acidic and basic functional groups, as discussed above.

Colorants

The energy curable inks of this invention contain one or more colorants in the form of a dye or pigment dispersed therein. Pigments suitable for use in the present invention include conventional organic or inorganic pigments. Representative pigments may, for example, be selected from the group Pigment Yellow 1, Pigment Yellow 3, Pigment Yellow 12, Pigment Yellow 13, Pigment Yellow 14, Pigment Yellow 17, Pigment Yellow 63, Pigment Yellow 65, Pigment Yellow 73, Pigment Yellow 74, Pigment Yellow 75, Pigment Yellow 83, Pigment Yellow 97, Pigment Yellow 98, Pigment Yellow 106, Pigment Yellow 111, Pigment Yellow 114, Pigment Yellow 121, Pigment Yellow 126, Pigment Yellow 127, Pigment Yellow 136, Pigment Yellow 138, Pigment Yellow 139, Pigment Yellow 174, Pigment Yellow 176, Pigment Yellow 188, Pigment Yellow 194, Pigment Orange 5, Pigment Orange 13, Pigment Orange 16, Pigment Orange 34, Pigment Orange 36, Pigment Orange 61, Pigment Orange 62, Pigment Orange 64, Pigment Red 2, Pigment Red 9, Pigment Red 14, Pigment Red 17, Pigment Red 22, Pigment Red 23, Pigment Red 37, Pigment Red 38, Pigment Red 41, Pigment Red 42, Pigment Red 48:2, Pigment Red 53:1, Pigment Red 57:1, Pigment Red 81:1, Pigment Red 112, Pigment Red 122, Pigment Red 170, Pigment Red 184, Pigment Red 210, Pigment Red 238, Pigment Red 266, Pigment Blue 15, Pigment Blue 15:1, Pigment Blue 15:2, Pigment Blue 15:3, Pigment Blue 15:4, Pigment Blue 61, Pigment Green 7, Pigment Green 36, Pigment Violet 1, Pigment Violet 19, Pigment Violet 23, Pigment Black 7. Pigment compositions which are a blend of conventional pigment and poly(alkylene oxide) grafted pigments are also suitable for use in the energy curable inks of this invention and are described in U.S. Pat. Nos. 4,946,508; 4,946,509; 5,024,698; 5,024,894; and 5,062,894 each of which is incorporated herein by reference.

Adjuvants

The energy curable compositions and inks of this invention may contain the usual adjuvants to adjust flow, surface tension and gloss of the cured coating or printed ink. Such adjuvants contained in inks or coatings typically are a surface-active agent, a wax, or a combination thereof. These adjuvants may function as leveling agents, wetting agents, dispersants, defrothers or deaerators. Additional adjuvants may be added to provide a specific function such as surface slip. Preferred adjuvants include fluorocarbon surfactants such as FC-4430 (commercially available product of the 3M Company, St Paul, Minn.); silicones such as DC57 (commercially available product of Dow Chemical Corporation, Midland, Mich.), Byk 024, Byk 019, Byk 023, Byk 373, Byk 381, Byk 3500, Byk 3510, Byk 3530, Byk 361, Byk 363 (commercially available products of Byk Chemie, Wesel, Germany) Foamex N, Foamex 8030, Foamex 810, Airex 900, Tegorad 2100, Tegorad 2200N, Tegorad 2250N, Tegorad 2500, Tegorad 2600 (Foamex, Airex and Tegorad are trademarks and are commercially available products of Tego Chemie, Essen, Germany.), Addid 700, Addid 810, Addid 840, Addid 300, Addid 310, Addid 320 (Addid is a trademark and commercially available from Wacker Silicones Corp., Adrian, Mich.); organic polymer surfactants like, Solspers 24000, Solspers 32000, Solspers 41090, Solspers 20000, Solspers 27000 (Solspers is a trademark and commercially available from United Color Technology, Inc., Newton, Pa.) Disperbyk 168, Disperbyk 184, Disperbyk 190, Disperbyk 192 (Disperbyk is a trademark and commercially available from Byk Chemie, Wesel, Germany.), Wet 500, Wet 505, Airex 920, Airex 910, Dispers 610, Dispers 605, Dispers 740, Dispers 750 and Dispers 760 (Dispers, Wet and Airex are trademarks and are commercially available from Tego Chemie, Essen, Germany.) Surfanol 105E, Surfanol 420, Dynol 604 (Surfanol and Dynol are trademarks and are commercially available from Air Products and Chemicals Inc., Allentown, Pa.); polyethylene wax; polyamide wax; polytetrafluoroethylene wax; and the like.

Preparation of Energy Cured Film

An embodiment of this invention is a method of forming a film and/or a printed ink image. Thus, the energy curable compositions of this invention may be applied to a variety of substrates and cured by a variety of methods for applications that include protective, decorative and insulating coatings; potting compounds; sealants; adhesives; photoresists; textile coatings; and laminates on a variety of substrates, e.g., metal, rubber, plastic, wood, molded parts, films, paper, glass cloth, concrete, and ceramic. The energy curable compositions of this invention are particularly useful in the manufacture of coatings and printing inks for use in a variety of Graphic Art applications and printing processes. Advantageously, the single phase compositions of this invention cure without the prior removal of water. Moreover, the single phase, energy curable compositions derived therefrom, are particularly useful in the wet-trap printing applications as disclosed in U.S. patent application Ser. No. 10/079,781 which was filed with the United States Patent and Trademark Office on Feb. 19, 2002, and incorporated herein by reference.

The embodiment of this invention directed to a method for forming a cured, water-resistant ink or coating on a substrate comprises applying to a substrate the energy curable, single phase, aqueous compositions of the invention to form a layer and subsequently subjecting the coated substrate to a source of actinic radiation. However, if the method is specifically directed to forming a water-resistant ink, the method additionally requires adding a colorant to the aqueous composition. The energy curable, aqueous composition may be any of the energy curable, aqueous compositions of this invention. Thus, the composition may comprise a single phase solution of water; an ethylenically unsaturated oligomer; and an ethylenically unsaturated resin containing neutralized acidic or basic functional groups. The oligomer employed may be a partially or a completely water soluble oligomer or may be a combination of partially water soluble, completely water soluble and water insoluble oligomers. Alternatively, the composition may comprise a single phase solution of water and an ethylenically unsaturated resin containing neutralized acidic or basic functional groups. As previously described the energy curable, aqueous composition may additionally require adding a photoinitiator, an adjuvant or a combination thereof.

The aqueous composition may be applied to the substrate surface as a coating in a uniform layer using any conventional coating technique. Therefore, compositions of the present invention may be applied by spin coating, bar coating, roller coating, curtain coating or by brushing, spraying, etc. Alternatively, the aqueous composition may be applied image-wise to a substrate surface, for instance as a printing ink, using any conventional industrial printing technique including flexographic, gravure, screen, lithographic, and ink jet printing.

The actinic radiation initiated cure is most effectively done with the water of the formula in place. Water as solvent lowers the viscosity permitting the reactive sites of polymerization to diffuse in the system and to propagate effectively to generate longer chains. The viscosity point at which effective reaction ceases is known as the vitrification point. In the presence of water above a critical level, a very low residual functionality remains after initiation of the polymerization, as vitrification is delayed by the decreased viscosity. Water also decreases the level of dissolved oxygen in the coating. This fact leads to more rapid cure as well.

From the moment the coating or ink of the present invention is applied, water starts evaporating. UV lamps and electron beams under nitrogen flow provide heat and gas flow that accelerates water removal. Depending on the characteristics of the particular cure unit operating as a dryer, there is a maximum level of water that will be removed per unit time in the curing zone. Without implying a limit, it is evident from the discussion above that a certain fraction of water must remain in the coating at the point of exit from the cure unit. In most cases, however, less water than the measured maximum can be coated without increasing the residual acrylic unsaturation, i.e., the rate of drying slows as the critical limit is approached. In our experience, the practical lower limit is ⅓ of the amount estimated from the maximum drying capacity. Characteristic of having water in place at the point of cure, the liquids of the present invention at greater than 25 wt. % water in the liquid phase cure to such complete conversion that no acrylate unsaturation can be detected by the usual reflection infrared techniques used in the industry.

Substrate

The substrate and its surface may be composed of any typical substrate material such as plastics, metals, composites, papers, etc.; and the energy cured film or layer on the substrate may be used in a variety of applications. The substrate may be print stock typically used for publications or may be a packaging material in the form of a sheet, a container such as a bottle or can, or the like. In most instances, the packaging material is a polyolefin such as a polyethylene or a polypropylene, a polyester such as polyethylene terphthalate, or a metal such as an aluminum foil, a metalized polyester, or a metal container. Once the aqueous, single phase, energy curable composition is applied to the packaging material it may be used to contain any kind of liquid or solid material such as foods, drinks, cosmetics, biological materials or specimens, pharmaceuticals, etc.

The single phase, energy curable, aqueous compositions of this invention will now be illustrated by the following examples, however, the specification is not intended to be limited thereby.

Example 1

To make example 1a, a water-soluble, ethylenically unsaturated, resin salt (53.8 g, resin concentrate containing 39 wt. % resin solids in water and neutralized with ammonia to pH 6.5 (2.7 g 12 N), as described in PCT International Patent Application WO 99/19369) was added to a partially water soluble, ethylenically unsaturated, acrylate-functional oligomer (11.0 g, Laromer 8765, Laromer is a trademark and commercially available product of BASF Corporation, Mount Olive, N.J.) and water (32.5 g). Using the same procedure as given for 1a, examples 1b, 1c 1d, 1e, and 1f as (amounts reported in Table 1) were assembled as homogeneous, single-phase compositions. Coating viscosity was measured using a rheometer at 10 s-1 and 25 deg C. (AR 1000-N, available from TA Instruments, New Castle, Del.) having a 4 cm, 2 deg. cone and plate geometry installed.

TABLE 1

| Coating Example | Water pph of Total | Resin Concentrate pph | LR 8765 Oligomer pph | Viscosity Pas 25 C., 10 s-1 |
| --- | --- | --- | --- | --- |
| 1a | 68.0 | 53.8 | 11.0 | 0.253 |
| 1b | 58.5 | 52.6 | 21.0 | 0.259 |
| 1c | 48.0 | 51.3 | 32.0 | 0.303 |
| 1d | 37.5 | 50.0 | 43.0 | 0.299 |
| 1e | 30.5 | 50.0 | 50.0 | 0.292 |
| 1f | 24.4 | 40.0 | 60.0 | 0.190 |

This example illustrates the assembly of ternary, single phase, aqueous, energy curable, coating compositions at useful viscosities containing a partially water soluble, ethylenically unsaturated oligomer; 15-21 wt. % of a water soluble, ethylenically unsaturated, resin ammonium salt; and over a range of 30-68 wt. % water. Solution if is a comparative example below 25 wt. % water.

Example 2

Industrial coatings were prepared using the single phase, aqueous, energy curable, coating compositions described in Examples 1a-1f after a wetting agent (0.25 g DC-57, a product of Dow Corning, Wildwood, Mo.) and a photoinitiator (1.0 g) er added to a 50 g aliquot of each composition. In this example, the coatings were applied to a polypropylene substrate (Mobil ASW, Exxon-Mobil Corp., Macedon, N.Y.) using a #3 wire-wound rod at variable rod speeds so as to place a range of wet coating weights on the film surface. The coatings were cured by passing under an ultra-violet lamp yielding a dose of 175 mJ/cm$^2$ (two medium pressure Hg lamps at 200 W/in each, 200 fpm on a UV Processor from RPC Industries, Plainfield, Ill. in air) within five seconds of the wet application. The resulting physical property and film performance data were measured for each coating after conditioning the film at 75 F and 48% RH for one day.

Water and alcohol or solvent (more specifically methylethylketone or MEK) rubs were determined by wetting the cured coated substrate with water or MEK and employing light finger pressure to rub (back and forth is one rub cycle) the coating off the substrate until a break-through to the original substrate surface is detected. The number of rub cycles required for break through was then recorded. Coating gloss was measured at a 60-degree angle using a calibrated micro-gloss meter (type DIN Geproft 4501, available from BYK Gardner). Scratch resistance was determined by the Hoffman method using the Modified Hoffman Scratch-Hardness Tester (SG-1610-M, available from Gardner Laboratory, Bethesda Md.). The number reported is the mass bearing on the metal cuticle that first breaks through the coating to expose the base.

The coating weight was determined gravimetrically by the difference in weight between a 10 cm×10 cm piece cut from the coated area and an identical size piece cut from a similar area of uncoated stock. Each attribute reported in Table 2 is normalized to 2.4 g/sqm dry coating weight by interpolation of the raw data as a function of coating weight.

TABLE 2

| Example | Viscosity (Pa · s.) | Gloss (%) | Scratch (9) | Water Rub | MEK Rub |
| --- | --- | --- | --- | --- | --- |
| 1a | 0.253 | 83 | 100 | 16 | 12 |
| 1b | 0.259 | 83 | 275 | 22 | 14 |
| 1c | 0.303 | 86 | 325 | 26 | 16 |
| 1d | 0.299 | 89 | 400 | 18 | 18 |
| 1e | 0.292 | 85 | 50 | 16 | 16 |
| 1f | 0.190 | 80 | 25 | 13 | 10 |

This example shows a strong peak in mechanical properties at compositions with 35-50 wt. % water not anticipated by the literature. The increase in mechanical strength from 1a to 1c is most likely the result of an increase in acrylate molar concentration, but the subsequent falloff toward lower water content is a specific rate and extent of cure effect of the solvent. Thus we prefer water at a higher level than would be suggested to be advantageous based on the literature.

Example 3

To a water insoluble, ethylenically unsaturated oligomer (11 g, Laromer 8945) was added a partially water soluble, ethylenically unsaturated, acrylate-functional oligomer (47 g, Laromer 8765) and a water soluble, ethylenically unsaturated, resin ammonium salt (42 g, resin concentrate containing 39 wt. % resin solids in water and neutralized with ammonia to pH 6.5, as described in PCT International Patent Application WO 99/19369).

This example illustrates the assembly of a quaternary, single phase, aqueous, energy curable, coating composition containing a water insoluble, ethylenically unsaturated oligomer; a partially water soluble, ethylenically unsaturated oligomer; with only 16.4 wt. % of a water soluble, ethylenically unsaturated, resin ammonium salt; and 26 wt. % water.

Example 4

To the aqueous resin salt described in U.S. Pat. No. 6,559,222 (58.0 g, resin concentrate containing 41.5 wt. % resin solids in water, amine-neutralized (Sun 924-1069, of Sun Chemical Corporation, Fort Lee, N.J.) to pH 6.5) was added a partially water soluble, ethylenically unsaturated oligomer (42.0 g, Laromer 8765).

This example illustrates the assembly of a ternary, single phase, aqueous, energy curable, coating composition containing 24 wt. % of a partially water soluble, ethylenically unsaturated, resin amine salt, a partially water soluble, ethylenically unsaturated oligomer, and 34 wt. % water.

Example 5

To the aqueous resin salt described in U.S. Pat. No. 6,559,222 (58.0 g, resin concentrate containing 41.5 wt. % resin solids in water, amine neutralized (Sun 924-1069, of Sun Chemical Corporation, Fort Lee, N.J.) to pH 6.5) was added a partially water soluble, ethylenically unsaturated oligomer (42.0 g, Laromer 8765). To this mixture is added a photoinitiator (3.0 g, Igracure 2959, Igracure is a trademark and commercially available product of Ciba Specialty Chemicals, Tarrytown, N.Y.). The mixture was then stirred until the photoinitiator dissolved.

This example illustrates the assembly of a ternary, single phase, aqueous, energy curable, coating composition containing 24 wt. % of a partially water soluble, ethylenically unsaturated, resin amine salt, a partially water soluble, ethylenically unsaturated oligomer, 31 wt. % water and a photoinitiator.

Example 6

To a water soluble, ethylenically unsaturated, resin salt (51.3 g, a resin concentrate containing 39 wt. % resin solids in water and neutralized with ammonia to pH 6.5 and described in PCT International Patent Application WO 99/19369) was added a partially water-soluble, acrylate-functional oligomer (32.0 g, Laromer 8765), and water (16.7 g). To this mixture was added a photoinitiator (3.0 g, Igracure 2959), and the mixture was stirred until the photoinitiator dissolved.

This example illustrates the assembly of a ternary, single phase, aqueous, energy curable, coating composition containing 19.5 wt. % of a water-soluble, ethylenically unsaturated, resin ammonium salt, a partially water soluble, ethylenically unsaturated oligomer, 47 wt. % water and a photoinitiator.

Example 7

To the aqueous resin salt described in PCT International Patent Application WO 99/19369 (85.1 g, a resin concentrate containing 39 wt. % resin solids in water and neutralized with ammonia to pH 6.5) was added water (41.9 g).

This example illustrates the assembly of a binary, single phase, aqueous, energy curable, coating composition containing a water soluble, ethylenically unsaturated resin and 74 wt. % water.

Example 8

To the aqueous, resin salt described in PCT International Patent Application WO 99/19369 (85.1 g, a resin concentrate containing 39 wt. % resin solids in water and neutralized with ammonia to pH 6.5) was added water (41.9 g). To this mixture a photoinitiator (3.0 g, Igracure 2959) was added, and the mixture stirred until the photoinitiator dissolved.

This example illustrates the assembly of a binary, single phase, aqueous, energy curable, coating composition containing a water soluble, ethylenically unsaturated resin, 72 wt. % water, and a photoinitiator.

Example 9

Industrial coatings were prepared using the single phase, aqueous, energy curable, coating compositions described in Examples 1 to 8 after a wetting agent (0.5 g DC-57, a product of Dow Corning, Wildwood, Mo.) was added to each coating composition. In this example, the coatings were applied to the substrate using a #3 wire-wound rod then cured on the substrate surface using either an electron beam with 3 Mrad dose at 175 kV (AEB Lab 105 from Advanced Electron Beam, Inc., Wilmington, Mass. under nitrogen at less than 100 ppm oxygen), or an ultra-violet lamp with 175 mJ/cm$^2$ dose (two medium pressure Hg lamps at 200 W/in each, 200 fpm on a UV Processor from RPC Industries, Plainfield, Ill. in air). The resulting physical property and film performance data was measured for each coating after conditioning the film at 75 F and 48% RH for one day.

Coating adhesion was measured by taking a convenient length of 600 or 610 tape (available from 3M Co., St Paul, Minn.) and laminating the tape to the cured surface under finger pressure then lifting the tape from the surface in one rapid motion. A coating was rated "pass" when the coating remained completely intact and adhered to the substrate. A coating was rated a "fail" when damage to the coating or any removal occurred.

For comparison of the impact of the pre-drying method on the coating properties coating examples 1c, 3, 4, 5, and 6 were first applied and cured in less than 15 sec from application (without pre-drying) and then applied, dried in air for an hour at 40 C, and cured under identical power settings (after pre-drying). The results of the performance tests for each coating are described in Table 3.

TABLE 3

| Example | System | Cure Method | Substrate | Pre-drying Method | Viscosity (Pa · s.) | Water Rubs | MEK Rubs | 60 DEG Gloss | Adhesion 610 Tape | Adhesion 600 Tape |
|---|---|---|---|---|---|---|---|---|---|---|
| 1c | Ternary | EB | Coated | No | 0.31 | 30 | 19 | 91 | pass | pass |
| 3 | Quaternary | EB | Cardboard | No | 0.32 | 36 | 18 | 83 | pass | fail |
| 4 | Ternary | EB | Paper[3] | No | 0.46 | 60 | 29 | 85 | pass | pass |
| 5 | Ternary | UV | Paper[4] | No | 0.44 | 61 | 26 | 88 | pass | pass |
| 6 | Ternary | UV | Coated | No | 0.34 | 20 | 21 | 83 | pass | fail |
| 7 | Binary | EB | Coated | No | 0.21 | 40 | 6 | 80 | pass | fail |
| 8 | Binary | UV | Coated | No | 0.21 | 38 | 6 | 78 | pass | fail |
| 1c | Ternary | EB | Coated | Yes | 0.31 | 9 | 2 | 86 | fail | fail |
| 3 | Quaternary | EB | Cardboard | Yes | 0.32 | 18 | 9 | 80 | fail | fail |
| 4 | Ternary | EB | Paper[3] | Yes | 0.46 | 27 | 17 | 77 | fail | fail |

TABLE 3-continued

| Example | System | Cure Method | Substrate | Pre-drying Method | Viscosity (Pa · s.) | Water Rubs | MEK Rubs | 60 DEG Gloss | Adhesion 610 Tape | Adhesion 600 Tape |
|---|---|---|---|---|---|---|---|---|---|---|
| 5 | Ternary | UV | Paper[4] | Yes | 0.44 | 21 | 14 | 88 | pass | fail |
| 6 | Ternary | UV | Coated PP[5] | Yes | 0.34 | 8 | 8 | 83 | pass | fail |

[1]saran coated polypropylene, Mobil ASW, available Exxon-Mobil Corp., Macedon, NY
[2]uncoated cardboard, Leneta Form N2A-Opacity, available Leneta Co., Mahwah, NJ
[3]clay coated paper, #50 SAPPI, available Sappi Fine Paper N.A., SD Warren Co, Boston, MA
[4]clay coated paper, #23 Strathmore, available Strathmore Papers, East Granby, CT
[5]saran coated polypropylene, Mobil ASW, printed with Sun OP Lam, available Sun Chemical Corporation, Fort Lee, NJ This example further demonstrates the improvement in cure-related properties when water remains in the coating at the point of cure. Gravimetric measurements indicate that this retained water is typically 15 wt. % of the coated dry weight (or approximately ⅓ of the coated water in Example 1c) at the exit from the photoreactor in the example without pre-drying. Drying in this instance is accomplished as an indirect result of the heat from the UV lamps and/or the by the nitrogen inerting in the case of electron beam curing. In the pre-dried example from 1c, less that 1% of the coated water was detected. Clearly, drying before curing as taught in the prior art is inferior in these examples.

Example 9 also demonstrates the high water resistance provided by orientation of hydrophobic ester functions even though most of the components of the coating are water-soluble. This is achieved equally well with UV light or electron beam initiation and over plastic, paper, or cardboard. The coatings over paper are generally more water-resistant than those over plastic as water has permeated the backing. Post-heating or simply longer storage at ambient conditions further increases the water-resistance of the coatings on plastic. But it is important to note that none of the examples in Table 2 block in a high humidity test, and we have routinely wound up long runs of these coatings on plastic without blocking.

Example 10

To a pigment (26.0 g, Clariant GDR Pigment Yellow 11-1025, Clariant is a trademark of Clariant Corporation, Coventry, R.I.) was added a water-soluble, ethylenically unsaturated, resin salt prepared as described in U.S. Pat. No. 6,559,222 (22.0 g, resin concentrate containing 41.5 wt. % resin solids in water, amine-neutralized (Sun 924-1069, of Sun Chemical Corporation, Fort Lee, N.J.) to pH 6.5), a polymeric hyperdispersant (12.5 g, Solsperse 41090, Solsperse is a trademark and commercially available product of Aecia Corporation, Blackly, Manchester, England), and ammonia (1.0 g, 30% NH4OH). Next, a silicone defoamer was added (0.5 g, BYK 019, BYK is trademark and commercially available product of BYK Chemie GmbH, Wesel, Germany) along with partially water soluble, acrylate functional oligomers (18.0 gm, Laromer 8765 and 4.0 gm, Sartomer SR 344), and water (16.0 g). The resulting composition was dispersed for 1 hour with a Cowles blade mixer, operating at 2000 rpm, then transferred and dispersed in an Eiger 'Mini' MK II media mill, operating at 5000 rpm, until full color strength was achieved (Eiger is a trademark and commercially available product of Eiger Machinery Corporation, Mundelein, Ill.).

This example illustrates the assembly of a printing ink concentrate (pigment dispersion or base) suitable for letting down or blending into (i.e. manufacturing) a printing ink product comprised of a pigment dispersed in a ternary, single phase, aqueous, energy curable composition containing 12.7 wt. % of a water soluble, ethylenically unsaturated resin salt, a partially water soluble oligomer, and 51 wt. % water in the vehicle.

Example 11

To the printing ink concentrate prepared in Example 10 (49.0 g) was added a partially water soluble, acrylate-functional oligomer (44.0 g, Laromer 8765), a silicone flow additive (1.0 g DC 57), and water (6.0 g). The resulting printing ink was stirred to uniformity with a Cowles blade mixer, operating at 1000 rpm, for 30 minutes.

This example illustrates the assembly of a ternary, single phase, aqueous, printing ink suitable for flexographic printing comprised of the ink concentrate prepared in Example 10, a partially water-soluble oligomer, and 28 wt. % water in the vehicle.

Example 12

The printing ink prepared in Example 11, having a viscosity of 0.625 Pas at a shear rate of 100 s$^{-1}$, was printed on a pre-treated, low-density polyethylene substrate with a Chesnut flexographic/gravure printing press equipped with a 600 lines/inch anilox and an enclosed, doctor-bladed chamber (Chesnut is a trademark and commercially available product of W.R. Chesnut Engineering Inc., Fairfield, N.J.). The printing plate used was DuPont's Cyrel photopolymer flexographic plate (Cyrel is a trademark and commercially available product of DuPont Company, Wilmington, Del.). A printing press speed of 150 feet per minute (fpm) was used. The printed product was cured with an ESI electron beam cure unit (Reference No. EC300-45-1050) operating at a dose rate of 2.5 Mrads and 125 kV and an oxygen level of 200 ppm (ESI is a trademark of Energy Sciences, Inc. Wilmington, Mass.). The printed product contained an odor free, glossy ink film having a print density of 0.97 with an alcohol rub resistance of 24 alcohol rubs. The ink film had 100 percent tape adhesion with Scotch 600 tape (Scotch 600 is a trademark and commercially available product of the 3M Company, St. Paul, Minn.).

Example 13

To the printing ink prepared in Example 11 was added a photoinitiator (4.0 g, Igracure 500).

This example illustrates the assembly of a ternary, single phase, aqueous, printing ink suitable for flexographic printing comprised of the ink concentrate prepared in Example 10, a partially water-soluble oligomer, a photoinitator, and 27 wt. % water in the vehicle.

Example 14

The printing ink prepared in Example 13 was printed on a substrate with a flexographic/gravure printing press, as described in Example 12, then cured with a Fusion F600 curing system operating at 300 Watts/inch (Fusion F600 is a trademark and commercially available product of Fusion UV Systems, Inc., Gaithersburg, Md.) at 150 fpm. The printed product contained a glossy ink film having a print density of 0.96 and an alcohol solvent (MEK) rub resistance of 20 alcohol rubs. The ink film had 100 percent tape adhesion with Scotch 600 tape.

Example 15

To the printing ink concentrate prepared in Example 10 (30.0 g) was added a water soluble, ethylenically unsaturated, resin salt, prepared as described in U.S. Pat. No. 6,559,222 (10.0 g, resin concentrate containing 41.5 wt. % resin solids in water, amine-neutralized (Sun 924-1069, of Sun Chemical Corporation, Fort Lee, N.J.) to pH 6.5), a partially water soluble, ethylenically unsaturated oligomer (30.0 g, Sartomer SR 344), a silicone wetting agent (1.0 g, DC57), a photoinitiator (4 g, Igracure 2959) and water (25.0 g). The mixture was stirred with a Cowles blade mixer, operating at 1000 rpm, for 30 minutes, until the photoinitiator dissolved.

This example illustrates the assembly of a ternary, single phase, aqueous, printing ink suitable for gravure printing comprised of the ink concentrate prepared in Example 10, a water soluble, ethylenically unsaturated, resin salt, a partially water-soluble, ethylenically unsaturated oligomer, a photoinitiator, and 44 wt. % water in the vehicle.

Example 16

The printing ink prepared in Example 15, having a viscosity of 37.1 mPas at a shear rate of 20 $s^{-1}$ at 25 degrees C., was used to print by direct gravure. The printing ink exhibited Newtonian flow behavior over a wide range of shear rates, i.e. 20 $s^{-1}$ to 2000 $s^{-1}$ which indicated its suitability for transfer from the small volume gravure cells of a gravure cylinder directly to a substrate. The printing ink was printed on a pre-treated, low-density polyethylene substrate using a handproofer equipped with a 150 lines per inch gravure cylinder. The printed product was cured with a medium pressure mercury lamp delivering a dose of 180 mJ/$cm^2$ in the RPC Industries laboratory UV processor. The printed product demonstrated a glossy ink film having a print density of 1.38 and 100 percent tape adhesion with Scotch 600 tape.

Example 17

To the printing ink concentrate prepared in Example 10 (10.0 g) was added a water soluble, ethylenically unsaturated, resin salt (10.0 g, resin concentrate containing 39 wt. % resin solids in water and neutralized with ammonia to pH 6.5, as described in PCT International Patent Application WO 99/19369), a partially water-soluble, ethylenically unsaturated oligomer (30.0 g, Sartomer SR 344), a silicone additive (0.5 g, DC-57), a photoinitiator (4 g, Igracure 2959), and water (45.5 g). The mixture was stirred with a Cowles blade mixer, operating at 1000 rpm, for 30 minutes.

This example illustrates the assembly of a ternary, single phase, aqueous, printing ink suitable for ink-jet printing comprised of the ink concentrate prepared in Example 9, a water soluble, ethylenically unsaturated resin salt (neutralized with ammonia), a partially water soluble, ethylenically unsaturated oligomer, a photoinitiator, and 60 wt. % water in the vehicle.

Example 18

The printing ink prepared in Example 17, having a viscosity of 17.1 mPas at a shear rate of 100 $s^{-1}$ at 25 degrees C., was used to print. The printing ink exhibited Newtonian flow behavior over a wide range of shear rates, i.e. 1 $s^{-1}$ to 1000 $s^{-1}$ which indicated its suitability for jetting through the small nozzles of an industrial piezo electric ink-jet head such as that supplied by Spectra, Inc. of Hanover, N.H. or Xaar, plc of Cambridge, UK. The printing ink was applied to a pre-treated, low-density polyethylene (LDPE) substrate with a 12 micron square bar applicator to simulate a jetted film and cured with an AEB Lab 105 electron beam curing unit at a dose of 3.0 mRads and an oxygen level of 200 ppm at 100 kV and 75 meters. The printed product contained a glossy ink film having a print density of 1.98 and 100 percent tape adhesion with Scotch 600 tape.

Example 19

To a pigment (5.0 g, Sunfast Blue 15:3 249-1275, Sunfast is a trademark of Sun Chemical Corporation, Fort Lee, N.J.) was added a water soluble, ethylenically unsaturated, resin salt neutralized with ammonia to pH 6.5 (13.5 g, described in PCT International Patent Application WO 99/19369), water (77.5 g) and a photoinitiator (4.0 g, Igracure 2959). The resulting composition was dispersed for 1 hour with a Cowles blade mixer, operating at 2000 rpm, then transferred and dispersed in an Eiger 'Mini' MK II media mill, operating at 5000 rpm, until full color strength was achieved.

This example illustrates the assembly of a binary, single phase, aqueous, energy curable, printing ink suitable for ink-jet printing containing a colorant, a water soluble, ethylenically unsaturated, resin salt (neutralized with ammonia), a photoinitiator, and 90 wt. % water in the vehicle.

Example 20

The printing ink prepared in Example 19, having a viscosity of 14.2 mPas at a shear rate of 100 $s^{-1}$ at 25 degrees C., was used to print. The printing ink exhibited Newtonian flow behavior over a wide range of shear rates, i.e. 1 $s^{-1}$ to 1000 $s^{-1}$ which indicated its suitability for jetting through the small nozzles of an industrial piezo electric ink-jet head such as that supplied by Spectra, Inc. of Hanover, N.H. or Xaar plc of Cambridge, UK. The printing ink was applied to a pre-treated, low-density polyethylene (LDPE) substrate with a 12 micron square bar applicator to simulate a jetted film and cured with a medium pressure mercury lamp operating at a dose of 180 mJ/$cm^2$ with the RPC Industries UV processor. The printed product contained an ink film having a print density of 2.26.

Example 21

To a pigment (12.5 g, Clariant GDR Pigment Yellow 11-1025) was added a water soluble, ethylenically unsaturated, resin salt prepared as described in U.S. Pat. No. 6,559,222 (38 g) and a pigment dispersant (6.2 g, Solsperse 41090) and talc (2.5 g). Next, a rheology-modifying silica (7.5 g, Cabosil M5, Cabosil is a trademark of Cabot Corporation, Billerica Mass.) and partially water soluble, acrylate-functional oligomers (27.4 g, Laromer 8765 and 6.0 g, Sartomer SR344) were added. The mixture was dispersed for 1 hour with a Cowles blade mixer, operating at 2000 rpm then transferred to and dispersed with a water-cooled, three-roll mill until full color strength was achieved.

This example illustrates the assembly of a ternary, single-phase, aqueous, printing ink suitable for waterless offset printing comprised of a colorant, a water-soluble, ethylenically-unsaturated, resin salt; partially water-soluble, ethylenically-unsaturated oligomers; and 48 wt. % water in the vehicle.

Example 22

The printing ink prepared in Example 21 (0.116 oz.), having a tack of 25 at 1200 rpm as measured with a Thwing-Albert Inkometer Model 106 (Thwing-Albert is a trademark of Thwing-Albert instrument Company, Philadelphia, Pa.) was applied to a cardboard substrate (Leneta Form N2A, Leneta is a trademark of The Leneta Company, Mahwah, N.J.) and cured with an AEB Lab 105 electron beam curing unit at a dose of 3.0 mRads and an oxygen level of 200 ppm at 100 kV and 75 meters per minute. The printed product contained a glossy ink film having a print density of 1.02.

Example 23

To an ethylenically unsaturated, resin salt prepared using an ethylenically unsaturated, amine functional oligomer (10 g, Laromer PO 94F) and an ethylenically unsaturated, acid-functional compound (5 g, Itaconic acid, commercially available from Aldrich Chemical, Milwaukee, Wis.) was added a water-soluble, ethylenically unsaturated oligomer (55 g, Laromer 8765) and water (30 g).

This example illustrates the assembly of a ternary, single phase, aqueous, coating composition comprised of a 15 wt. % ethylenically unsaturated, resin salt (prepared from a basic resin neutralized with acid), a water soluble, ethylenically unsaturated oligomer, and 30 wt. % water.

Example 24 (Comparative)

To a water soluble, ethylenically unsaturated resin (51.3 g, 924-1049 resin concentrate containing 39 wt. % resin solids in water and neutralized with ammonia to a pH of 6.5, described in PCT Published Patent Application WO 99/19369) was added a partially water soluble, ethylenically unsaturated oligomer (32 g, Laromer 8765) and water (15.5 g). The pH of this mixture was adjusted to 4.5 by adding concentrated HCl (1.2 g). To the resulting inhomogeneous mixture was added a wetting agent (0.5 g DC-57). This mixture was blended with a Cowles mixer producing a poorly emulsified liquid having a viscosity of 100 cP.

This example illustrates the assembly of a ternary, two phase, aqueous, energy curable composition containing a partially water soluble oligomer, a water soluble, ethylenically unsaturated, polymeric, solubilizing resin having only partially neutralized acid groups and acrylate groups, and 48 wt. % water, but at too low a pH to allow incorporation of the resin into a single, aqueous phase.

Example 25 (Comparative)

A portion of the resulting emulsified liquid prepared in Example 24 was coated (using a #3 wire-wound rod) on saran-coated Mobil ASW polypropylene and immediately cured by electron beam at a dose of 3.0 Mrad and in an atmosphere containing 100 ppm oxygen.

Example 26 (Comparative)

To the remainder of the emulsified liquid prepared in Example 24 was added a photoinitiator (3 g, Igracure 2959) and the resulting mixture was further mixed with a Cowles to form an emulsified liquid. A portion of the emulsified liquid was coated (using a #3 wire-wound rod) on a solvent-inked, saran-coated, Mobil ASW polypropylene and immediately cured by ultraviolet radiation at a dose of 175 mJ/cm$^2$, under an ambient oxygen atmosphere.

Example 27 (Comparative)

To the coating composition prepared in Example 7 (65 g) was added a partially water soluble, ethylenically unsaturated oligomer (35 g, Laromer 8765). The resulting composition was mixed to yield a coating liquid that slowly phase-separated.

This example illustrates the assembly of a ternary, two phase, aqueous, energy curable composition containing a partially water soluble oligomer, a water soluble, ethylenically unsaturated, polymeric, solubilizing resin having only partially neutralized acid groups and acrylate groups at a pH of 6.5 and water at a ratio where the oligomer could not be incorporated into a single phase composition.

Example 28 (Comparative)

A portion of the blended liquid prepared in Example 27 was coated (using a #3 wire-wound rod) on uncoated card stock (Leneta Form N2A-Opacity, manufactured by Leneta Company, 15 Whitney Rd., Mahwah, N.J.) and immediately cured by electron beam at a dose of 3.0 Mrad under an atmosphere containing 100 ppm oxygen.

Example 29 (Comparative)

To the remaining portion of the liquid prepared in Example 28 was added photoinitiator (3.0 g, Igracure 2959). The resulting coating mixture was mixed to form a uniform dispersion. The liquid was then coated (using a #3 wire-wound rod) on uncoated card stock (Form N2A-Opacity) and cured by ultraviolet radiation at a dose of 175 mJ/cm$^2$ under an ambient oxygen atmosphere.

Example 30

The results of the performance tests for each comparative coating are described in Table 4 along with the two inventive samples repeated from earlier Tables to which they most directly compare.

TABLE 4

| Example | System | Phase Condition | Cure pH | Method | Substrate | Viscosity (Pa · S) | Water Rubs | MEK Rubs | 60 DEG Gloss | Adhesion 610 Tape | Adhesion 600 Tape |
|---|---|---|---|---|---|---|---|---|---|---|---|
| 1c | Ternary | Single-phase | 6.5 | EB | Coated PP[1] | 0.31 | 30 | 19 | 91 | Pass | Pass |
| 24 | Ternary | Two-phase | 4.5 | EB | Coated PP[1] | 0.11 | 10 | 2 | 80 | Fail | Fail |
| 27 | Ternary | Two-phase | 6.5 | EB | Cardboard[2] | 0.15 | 8 | 7 | 82 | Pass | Fail |
| 6 | Ternary | Two-phase | 6.5 | UV | Coated PP[5] | 0.34 | 20 | 21 | 83 | Pass | Fail |
| 26 | Ternary | Two-phase | 4.5 | UV | Coated PP[5] | 0.11 | 12 | 3 | 73 | Fail | Fail |
| 29 | Ternary | Two-phase | 6.5 | UV | Cardboard[2] | 0.15 | 7 | 9 | 71 | Pass | Fail |

[1]saran coated polypropylene, Mobil ASW, available Exxon-Mobil Corp., Macedon, NY
[2]uncoated cardboard, Leneta Form N2A-Opacity, available Lenate Co., Mahwah, NJ
[3]clay coated paper, #50 SAPPI, available Sappi Fine Paper N.A., SD Warren Co, Boston, MA
[4]clay coated paper, #23 Strathmore, available Strathmore Papers, East Granby, CT
[5]saran coated polypropylene, Mobil ASW, printed with Sun OP Lam, available Sun Chemical Corporation, Fort Lee, NJ This example illustrates that a single phase composition is superior to a multi-phase composition even when the components and methods of cure are the same. Example 24 differs from Example 1c (and 26 from 6) by 2 pH units (or 10exp-4.6 hydrogen ion concentration) which affects the resin solubility. And Example 27 differs from Example 1c (and 29 from 6) by a small increase in the proportion of the more reactive (partially water-soluble oligomeric) component to a point just to the left of the cloud point curve in a diagram not unlike FIG. 1. The two phase, comparative examples show, both in gloss and mechanical rub resistance, that they are less coherent than their single phase counterparts.

Those skilled in the art having the benefit of the teachings of the present invention as hereinabove set forth, can effect numerous modifications thereto. These modifications are to be construed as being encompassed within the scope of the present invention as set forth in the appended claims.

What is claimed is:

1. An energy curable aqueous composition comprising:
   (a) water;
   (b) a water soluble ethylenically unsaturated oligomer; and
   (c) a water soluble ethylenically unsaturated resin containing neutralized acidic functional groups;
   wherein the resulting composition is a single phase composition; and wherein the composition is curable by ultraviolet radiation or electron beam radiation; and wherein the ratio of resin to oligomer is 1.0 to 0.2.

2. The composition of claim 1 wherein the water soluble ethylenically unsaturated oligomer is selected from the group consisting of an acrylate oligomer, a methacrylate oligomer, and combinations thereof.

3. The composition of claim 2 wherein the acrylate oligomer contains more than one acrylate functional groups and the methacrylate oligomer contains more than one methacrylate functional groups.

4. The composition of claim 2 wherein the acrylate oligomer is selected from the group consisting of epoxy acrylate, polyether acrylate, polyester acrylate, polyurethane acrylate, polyol acrylates, melamine acrylate, ethoxylated trimethanolpropane acrylate, ethoxylated di(trimethanolpropane) acrylate, ethoxylated pentaerythritol acrylate, ethoxylated dipentaerythritol acrylate, ethoxylated neopentaglycol acrylate, ethoxylated propylene glycol acrylates, and polyethylene glycol diacrylate; and the methacrylate oligomer is selected from the group consisting of: epoxy methacrylate, polyether methacrylate, polyester methacrylate, polyurethane methacrylate, polyol methacrylates, melamine methacrylate, ethoxylated trimethanolpropane methacrylate, ethoxylated di(trimethanolpropane) methacrylate, ethoxylated pentaerythritol methacrylate, ethoxylated dipentaerythritol methacrylate, ethoxylated neopentaglycol methacrylate, ethoxylated propylene glycol methacrylates, and polyethylene glycol dimethacrylate.

5. The composition of claim 4 wherein the acrylate oligomer is epoxy acrylate and methacrylate oligomer is epoxy methacrylate.

6. The composition of claim 1 wherein the water soluble ethylenically unsaturated resin contains acrylic-functional groups, methacrylic-functional groups or a combination thereof.

7. The composition of claim 1 wherein the water soluble ethylenically unsaturated resin contains carboxylic acid functional groups.

8. The composition of claim 1 wherein the water soluble ethylenically unsaturated resin is selected from the group consisting of polyester, polyurethane, polyacrylic, polyvinyl, polyurea, polyamid, polyol, polycarboxylic acid, polystyrene/maleic anhydride copolymer, and copolymers thereof.

9. The composition of claim 1 wherein the water soluble ethylenically unsaturated resin is a styrene/maleic anhydride copolymer, partially esterified with a hydroxy alkyl acrylate or methacrylate functional group.

10. The composition of claim 9 wherein the partially esterified styrene/maleic anhydride copolymer is further esterified with an alcohol.

11. The composition of claim 7 wherein the carboxylic acid functional groups are neutralized with a neutralizing agent or mixture of neutralizing agents.

12. The composition of claim 11 wherein the neutralizing agent is selected from ammonia, amines, alkali metal hydroxides or a mixture thereof.

13. The composition according to claim 7, wherein the water soluble ethylenically unsaturated resin unsaturated resin has an acid number greater than 80 and a weight average molecular weight between 1,000 and 100,000 daltons.

14. The composition of claim 1 further comprising a free-radical photoinitiator.

15. The composition of claim 1 wherein water is greater than 25 wt. %.

16. The composition of claim 1 wherein the water soluble ethylenically unsaturated resin containing neutralized acidic functional groups is less than 60 wt. %.

17. The composition of claim 16 wherein water is greater than 25 wt. %.

18. An energy curable, aqueous composition comprising:
(a) water; and
(b) a water soluble ethylenically unsaturated resin containing neutralized acidic functional groups;
wherein the composition is a single phase composition.

19. The composition of claim 18 wherein the water is greater than 26 wt. %.

20. The composition of claim 18 wherein the water soluble ethylenically unsaturated resin contains acrylic-functional groups, methacrylic-functional groups or a combination thereof.

21. The composition of claim 18 wherein the acidic functional groups contained by the resin are carboxylic acid functional groups.

22. The composition of claim 18 wherein the water soluble ethylenically unsaturated resin is a styrene/maleic anhydride copolymer, partially esterified with a hydroxy alkyl acrylate or methacrylate group.

23. The composition of claim 22 wherein the partially esterified styrene/maleic anhydride copolymer is further esterified with an alcohol.

24. The composition of claim 21 wherein the carboxylic acid functional groups are neutralized with a neutralizing agent or a mixture of neutralizing agents.

25. The composition of claim 24 wherein the neutralizing agent is selected from alkali metal hydroxides, ammonia, amines or a mixture thereof.

26. The composition of claim 23 wherein the water soluble ethylenically unsaturated resin has an acid number greater than 80 and a weight average molecular weight between 1,000 and 100,000 daltons.

27. The composition of claim 18 further comprising a free radical photoinitiator.

* * * * *